(12) United States Patent
Morris et al.

(10) Patent No.: US 10,252,794 B2
(45) Date of Patent: *Apr. 9, 2019

(54) AIRCRAFT AUTONOMOUS PUSHBACK

(71) Applicant: AIRBUS OPERATIONS LIMITED, Bristol (GB)

(72) Inventors: James Morris, Bristol (GB); Antonio Colosimo, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,705

(22) Filed: Aug. 29, 2018

(65) Prior Publication Data

US 2019/0009891 A1    Jan. 10, 2019

Related U.S. Application Data

(63) Continuation of application No. 15/819,922, filed on Nov. 21, 2017, now Pat. No. 10,086,929, which is a (Continued)

(30) Foreign Application Priority Data

Aug. 22, 2013 (GB) .................................. 1315012.3

(51) Int. Cl.
*B64C 25/44* (2006.01)
*B64C 25/34* (2006.01)
(Continued)

(52) U.S. Cl.
CPC .............. *B64C 25/445* (2013.01); *B60T 8/00* (2013.01); *B60T 8/1703* (2013.01); *B64C 25/34* (2013.01); *B64C 25/405* (2013.01); *Y02T 50/823* (2013.01)

(58) Field of Classification Search
CPC ..... B64C 25/34; B64C 25/405; B64C 25/445; B64C 25/50; B64C 25/505; B60T 8/00; (Continued)

(56) References Cited

U.S. PATENT DOCUMENTS 3,024,858 A * 3/1962 Davis ..................... B60K 17/10
                                                      180/19.2
3,874,619 A * 4/1975 Collins ................. B64C 25/405
                                                      180/7.1
(Continued)

FOREIGN PATENT DOCUMENTS

CN      103112592       5/2013
EP        2243703       10/2010
(Continued)

OTHER PUBLICATIONS

Japanese Office Action issued in Appln. No. 2016-535523 dated May 29, 2018 (w/ translation).
(Continued)

*Primary Examiner* — Medhat Badawi
(74) *Attorney, Agent, or Firm* — Nixon & Vanderhye P.C.

(57) ABSTRACT

The invention provides methods and systems for controlling speed of an aircraft during an autonomous pushback manoeuvre, i.e. under the aircraft's own power without a pushback tractor. The method includes applying a torque to at least one landing gear wheel of the aircraft, the torque being in a direction opposite to the backwards rolling direction of rotation of the landing gear wheel. The torque applied does not exceed a limit for ensuring aircraft longitudinal stability. For longitudinal stability the torque applied should not cause the aircraft to risk a tip-over event.

44 Claims, 5 Drawing Sheets

Related U.S. Application Data continuation of application No. 14/912,692, filed as application No. PCT/GB2014/052217 on Jul. 21, 2014, now Pat. No. 9,849,972.

(51) Int. Cl.
  *B60T 8/00* (2006.01)
  *B64C 25/40* (2006.01)
  *B60T 8/17* (2006.01)

(58) Field of Classification Search
  CPC .. B60T 8/1703; B64F 1/22; B64F 2700/6234; Y02T 50/823
  See application file for complete search history.

(56) References Cited

U.S. PATENT DOCUMENTS

| | | | |
|---|---|---|---|
| 4,610,411 A * | 9/1986 | Veaux | B64C 25/50 180/428 |
| 5,480,274 A * | 1/1996 | Franken | B64F 1/22 180/904 |
| 6,220,676 B1 | 4/2001 | Rudd, III | |
| 6,305,484 B1 * | 10/2001 | Leblanc | B60T 7/16 180/167 |
| 6,657,334 B1 * | 12/2003 | Edelson | H02K 3/28 310/166 |
| 6,838,791 B2 * | 1/2005 | Edelson | H02K 3/28 310/49.35 |
| 7,226,018 B2 * | 6/2007 | Sullivan | B60L 7/26 244/111 |
| 7,445,178 B2 | 11/2008 | McCoskey et al. | |
| 8,220,740 B2 * | 7/2012 | Cox | B64C 25/40 244/100 R |
| 8,474,749 B2 * | 7/2013 | Cros | B64C 25/405 244/100 R |
| 8,517,303 B2 * | 8/2013 | Dilmaghani | B64C 25/405 244/100 R |
| 8,626,392 B2 * | 1/2014 | Kojo | B62D 15/025 114/163 |
| 9,394,059 B2 * | 7/2016 | Cox | B64D 45/00 |
| 9,457,896 B2 * | 10/2016 | De Mers | B64C 25/405 |
| 9,630,708 B2 * | 4/2017 | Lo | B64C 25/42 |
| 9,658,621 B2 * | 5/2017 | Fusaro | G05D 1/0202 |
| 9,676,475 B2 * | 6/2017 | Goldman | B64C 25/405 |
| 9,688,392 B2 * | 6/2017 | Kawalkar | B64C 25/405 |
| 9,715,831 B2 * | 7/2017 | Cox | G08G 5/0013 |
| 9,771,149 B2 * | 9/2017 | Lazarovich | B64C 25/405 |
| 9,849,972 B2 * | 12/2017 | Morris | B60T 8/1703 |
| 2005/0007044 A1 * | 1/2005 | Qiu | G05B 13/048 318/400.02 |
| 2006/0065779 A1 * | 3/2006 | McCoskey | B64F 1/32 244/100 R |
| 2006/0186736 A1 * | 8/2006 | DeVlieg | B60T 8/00 303/126 |
| 2006/0226698 A1 * | 10/2006 | Riebe | B60T 8/1703 303/20 |
| 2007/0101721 A1 * | 5/2007 | Dooley | F01D 15/10 60/721 |
| 2007/0158497 A1 * | 7/2007 | Edelson | B64C 25/40 244/103 S |
| 2007/0175713 A1 * | 8/2007 | DeVlieg | B60T 8/00 188/158 |
| 2007/0282491 A1 * | 12/2007 | Cox | B64C 25/40 701/3 |
| 2008/0059053 A1 * | 3/2008 | Cox | B64C 25/405 701/121 |
| 2008/0103642 A1 * | 5/2008 | Cox | G08G 5/065 701/3 |
| 2008/0296429 A1 * | 12/2008 | Edelson | B64C 25/405 244/50 |
| 2009/0065636 A1 | 3/2009 | Mathieu | |
| 2009/0114765 A1 * | 5/2009 | Cox | B64C 25/40 244/50 |
| 2009/0218440 A1 * | 9/2009 | Dilmaghani | B64C 25/405 244/50 |
| 2009/0261197 A1 * | 10/2009 | Cox | B64C 25/36 244/50 |
| 2009/0294577 A1 * | 12/2009 | Roques | B64C 25/40 244/50 |
| 2010/0065678 A1 * | 3/2010 | Kiyosawa | B64C 25/405 244/50 |
| 2010/0140392 A1 * | 6/2010 | Perry | B64C 25/50 244/50 |
| 2010/0217456 A1 | 8/2010 | Edelson et al. | |
| 2010/0276535 A1 * | 11/2010 | Charuel | B64C 25/405 244/50 |
| 2011/0155846 A1 * | 6/2011 | Bulin | B64C 25/405 244/50 |
| 2012/0018574 A1 * | 1/2012 | Bayer | B64C 25/405 244/50 |
| 2012/0104158 A1 | 5/2012 | Charles et al. | |
| 2012/0104160 A1 * | 5/2012 | Baumann | B64C 25/405 244/50 |
| 2012/0168557 A1 * | 7/2012 | Edelson | B64C 25/405 244/50 |
| 2012/0217339 A1 * | 8/2012 | Gilleran | B64C 25/405 244/50 |
| 2013/0200209 A1 * | 8/2013 | Goldman | B64C 25/405 244/50 |
| 2014/0114557 A1 * | 4/2014 | Nutaro | G01C 21/00 701/121 |
| 2014/0379213 A1 * | 12/2014 | Otake | G08G 1/09626 701/36 |
| 2015/0203193 A1 * | 7/2015 | Cox | B64C 25/405 701/2 |
| 2015/0253773 A1 * | 9/2015 | Cox | G05D 1/0083 701/3 |
| 2015/0266565 A1 * | 9/2015 | Cox | B64C 25/405 244/50 |
| 2016/0052624 A1 * | 2/2016 | Edelson | B64C 25/405 244/103 R |
| 2016/0200428 A1 | 7/2016 | Morris et al. | |

FOREIGN PATENT DOCUMENTS

| | | |
|---|---|---|
| GB | 2292195 | 2/1996 |
| JP | 11-286268 | 10/1999 |
| JP | 2008-518821 | 6/2008 |
| JP | 2011-116360 | 6/2011 |
| JP | 2012-56420 | 3/2012 |
| JP | 2013-503070 | 1/2013 |
| WO | 2007027588 | 3/2007 |
| WO | 2011023505 | 3/2011 |
| WO | 2012061532 | 5/2012 |
| WO | 2012106643 | 8/2012 |
| WO | 2012109380 | 8/2012 |

OTHER PUBLICATIONS

International Search Report and Written Opinion in PCT/GB2014/052217, dated Oct. 16, 2014.

Chinese First Office Action for Chinese Application No. 201480046591.4, dated Dec. 30, 2016.

English translation of Notification of Reasons for Refusal for Japanese Application No. 2016-535523, four pages, dated Dec. 11, 2018.

* cited by examiner

AIRCRAFT AUTONOMOUS PUSHBACK

RELATED APPLICATIONS

The present application is a continuation of U.S. application Ser. No. 15/819,922, filed Nov. 21, 2017, now allowed; which is a continuation of U.S. application Ser. No. 14/912,692 filed Feb. 18, 2016, now U.S. Pat. No. 9,849,972; which is a National Phase of International Application Number PCT/GB2014/052217 filed Jul. 21, 2014, and claims priority from Great Britain Application No. 1315012.3, filed Aug. 22, 2013. The disclosures of all of the above-listed prior applications are hereby incorporated by reference herein in their entirety.

FIELD OF THE INVENTION

The present invention relates to reversing of an aircraft on the ground using an autonomous taxiing system, and in particular the invention relates to decelerating the aircraft when reversing.

BACKGROUND OF THE INVENTION

It is sometimes necessary to move an aircraft in reverse whilst the aircraft is on the ground. For example aircraft are frequently pushed backwards away from an airport gate, a so called "pushback" manoeuvre, by a vehicle known as a pushback tractor or tug. The same tractor or tug can also move the aircraft forward if desired. Whilst some aircraft have the capability to reverse under their own power using the main aircraft engines, e.g. by using reverse thrust in a manoeuvre known as "power back", this is not permitted for civil aircraft as the jet or prop wash from the engines can cause damage to nearby terminal buildings or facilities.

Recently it has been proposed to equip aircraft with an autonomous wheel drive taxi system that can drive one or more of the aircraft landing gear wheels in rotation so that the aircraft can taxi under its own power. The ability to drive the aircraft landing gear wheel in reverse using the wheel drive system enables an autonomous pushback operation without the main engines running, as well as a forward taxiing operation with or without one or more of the main engines running. The autonomous pushback operation makes the autonomous wheel drive taxi system particularly suitable for civil aircraft but the system has wide applicability to a wide variety of aircraft including: civil and military; fixed wing, rotary wing and powered lift; manned and unmanned, etc.

For conventional pushback operations, braking is performed by the tractor. Use of the brake pedals is generally prohibited as there is a risk of damaging the nose landing gear and the tractor. With an autonomous wheel drive taxi system, i.e. without a tractor unit, braking will need to be performed autonomously on the aircraft. Conventional aircraft braking systems are typically not designed to perform this function, being more suited to high energy dissipation in the landing phase and low energy dissipation working against the thrust of the main aircraft engines in the taxi phase. Conventional aircraft braking systems are therefore generally unsuited to braking during an autonomous pushback operation. The autonomous pushback introduces the risk of aircraft tip over (where the aircraft tends to rotate nose up about its pitch axis, possibly causing a tail strike) and aircraft runaway (where if the autonomous pushback manoeuvre is performed on a slope the longitudinal component of the gravity acceleration can become higher than the rolling resistance of the tyres on the ground such that the aircraft accelerates above the desired pushback speed).

SUMMARY OF THE INVENTION

A first aspect of the invention provides a method of controlling speed of an aircraft during backwards motion of the aircraft when in contact with the ground, the method comprising: applying a torque to at least one landing gear wheel of the aircraft, the torque being in a direction opposite to the backwards rolling direction of rotation of the landing gear wheel, wherein the torque applied does not exceed a limit for ensuring aircraft longitudinal stability.

A further aspect of the invention provides an autonomous pushback braking system for an aircraft having a wheel drive system for driving one or more of the aircraft's landing gear wheels in rotation, wherein the wheel drive system is operable to drive the wheel in rotation to effect backwards motion of the aircraft when in contact with the ground, and a means for applying a torque to at least one landing gear wheel of the aircraft, the torque being in a direction opposite to the backwards rolling direction of rotation of the landing gear wheel, and wherein the torque applied does not exceed a limit for ensuring aircraft longitudinal stability.

For longitudinal stability the torque applied to decelerate the aircraft during a pushback manoeuvre should not cause the aircraft to risk a tip-over event. Accordingly the torque limit may be selected such that a) the aircraft cannot tip back onto its tail, and/or b) a nose landing gear of the aircraft does not part contact with the ground, and/or c) a substantially vertical load through a nose landing gear wheel does not fall below a threshold at which a steering centring device maintains the wheel of the nose landing gear straight.

The torque limit may be based upon one or more of the following instantaneous aircraft parameters when the torque is applied: a slope angle of the ground over which the aircraft is moving; the centre of gravity of the aircraft; the mass of the aircraft; an aircraft inertia moment around the aircraft lateral (y) axis; the backwards speed of the aircraft.

The backwards motion of the aircraft may be effected by a wheel actuator carried by the aircraft for driving one or more of the aircraft's landing gear wheels in rotation and/or by gravity due to a slope angle of the ground over which the aircraft is moving.

In an autonomous pushback manoeuvre the backwards motion of the aircraft is effected autonomously in the absence of an external tractor unit. However, pushback runaway may also be caused by an inadvertent release of the park brake even when a pushback manoeuvre has not been commanded.

The step of applying torque to the landing gear wheel may comprise applying a braking torque to the wheel using a friction brake assembly.

The aircraft speed may be measured and if this speed exceeds a predetermined limit at which the aircraft longitudinal stability cannot be ensured then an indication is displayed in the aircraft cockpit.

The braking torque may be effected by a braking control system or by a park brake system. The braking torque may be initiated by a pilot input, e.g. using cockpit brake pedals or a park brake lever.

The braking control system may send a braking command to only a limited number of braking wheels. For example where the aircraft has N braking wheels the braking control system may send a braking command to a number n of the braking wheels where n<N.

The braking control system may limit the maximum braking clamping pressure applicable to the friction brake assemblies to no more than a limit at which the aircraft longitudinal stability is ensured.

The maximum braking clamping pressure may be variable depending on the mass and longitudinal centre of gravity position of the aircraft.

The braking control system may implement a braking law that commands initially a low brake pressure which rises with increasing time.

The braking torque may be applied whilst the wheel actuator is driving the aircraft backwards.

The wheel actuator torque and the braking torque may be controlled by a common controller. The controller may receive input of the aircraft speed and control the wheel actuator torque and the braking torque towards a target speed.

The step of applying torque to the landing gear wheel may alternatively comprise applying a braking torque to the wheel using a generator.

The generator may be coupled either to an electrical network of the aircraft or to a resistor for dissipating the electrical energy generated by the generator.

The generator is preferably a motor/generator used to drive one or more of the aircraft's landing gear wheels in rotation to effect the backwards motion of the aircraft.

The motor/generator may be selectively coupled to the landing gear wheel(s) by a drive path. Preferably the drive path includes a gear mounted to the wheel rim and a pinion, wherein the pinion is moveable between an engaged position in which the pinion is in driving engagement with the wheel gear and a disengaged position in which the pinion is physically separated from the wheel gear.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
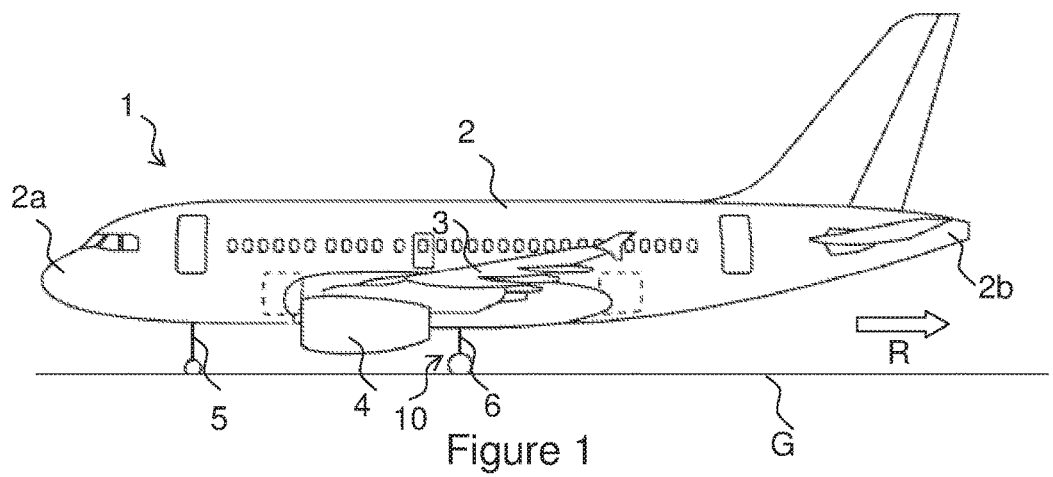
FIG. 1 illustrates an aircraft performing an autonomous pushback operation.

FIG. 1 shows an aircraft 1 having a fuselage 2 including a nose 2a and a tail 2b, wings 3, main engines 4, nose landing gear 5 and main landing gear 6. The aircraft has two main landing gears 6, one on either side of the aircraft centreline, and a single nose landing gear 5 forming a tripod. Each landing gear 5, 6 has a diablo configuration with two wheels.

The aircraft 1 is typical of a short range single aisle passenger jet aircraft, although it will be appreciated that the invention has applicability to a wide variety of aircraft types as mentioned above. In particular the aircraft may have a greater or fewer number of landing gears; and each landing gear may have any number of wheels, including one.

Figure 3:
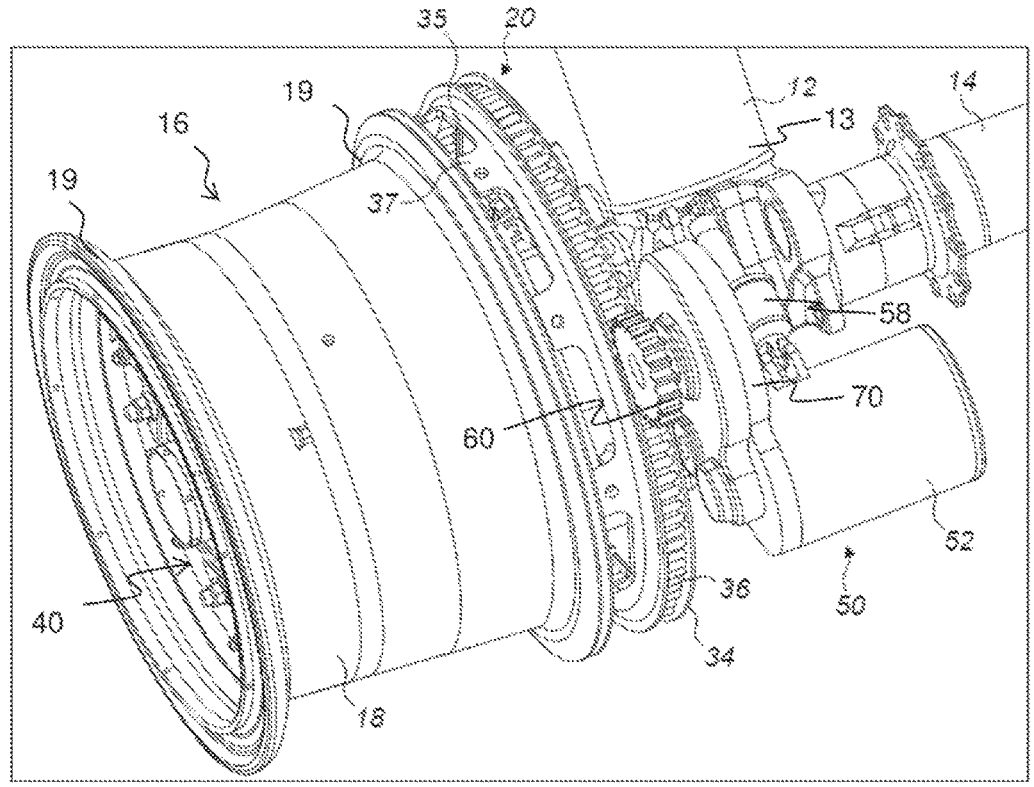
FIG. 3 illustrates a wheel drive system of the aircraft.

Each main landing gear 6 has a wheel drive system 10, shown in detail in FIG. 3. The wheel drive system 10 is for driving one wheel of the main landing gear 6 (typically the outboard wheel but may alternatively be the inboard wheel) in rotation to taxi the aircraft on the ground. The wheel drive system 10 is operated without the main engines 4 running for reversing the aircraft. The wheel drive system 10 is operated either with or without one or more of the main engines running for taxiing the aircraft forward. For the avoidance of doubt the forward direction is along the aircraft longitudinal axis nose first and the reverse direction is along the aircraft longitudinal axis tail first.

Figure 2:
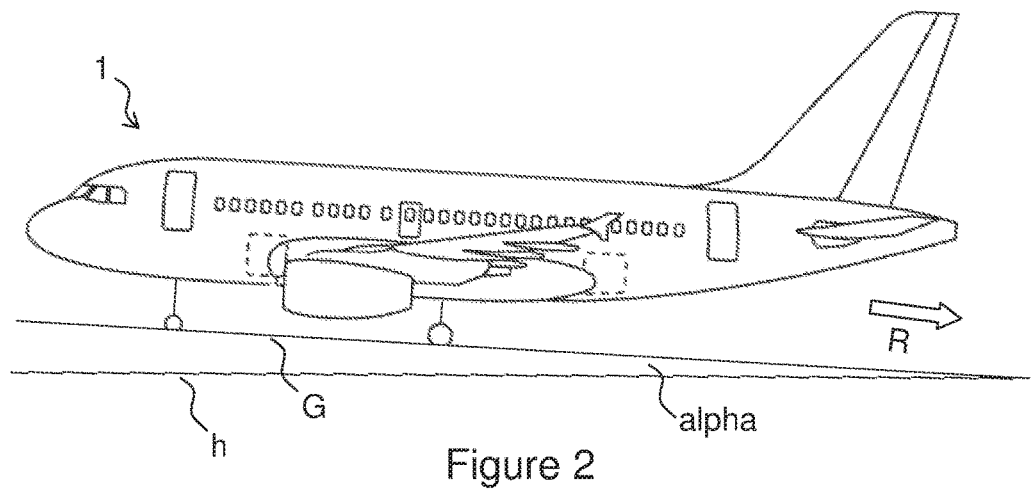
FIG. 2 illustrates the aircraft on sloping ground.

In FIG. 1 the aircraft is shown reversing, indicated by the direction arrow R, whilst the landing gear wheels are in contact with the ground G which is substantially level, i.e. zero slope with the horizontal. In FIG. 2 the aircraft 1 is shown reversing, indicated by the direction arrow R, whilst the landing gear wheels are in contact with the ground G which has a slope angle alpha ($\alpha$) to the horizontal, h.

Wheel Drive System

FIG. 3 shows a partial view of the wheel drive system 10. The main landing gear 6 includes a telescopic shock-absorbing main leg 12, including an upper telescopic part (main fitting) and a lower telescopic part (slider) 13. The upper telescopic part is attached to the aircraft fuselage or wing (not shown) by its upper end (not shown). The lower telescopic part supports an axle 14 carrying a pair of wheels 16, one on either side of the main leg. Each wheel comprises a tyre supported by a hub 18 (only the hub 18 of one wheel 16 is shown in FIG. 3, for clarity). The wheels 16 are arranged to rotate about the axle 14 to enable ground movement of the aircraft, such as taxiing or landing.

Each wheel hub 18 has a rim 19 for holding the tyre (not shown). The wheel drive system 10 includes a driven gear 20 attached to the hub 18 so as to be rotatable with the wheel 16, the driven gear 20 comprising a roller gear 34 formed by two rigid annular rings 35 connected together by a series of rollers 36 extending around the rings to form a continuous track. The rollers 36 are each rotatable about a pin (not shown) which extends between the annular rings 35 to form a rigid connection between the annular rings 35. One of the annular rings 35 comprises a plurality of connection extension tabs 37 which provide a rigid connection to the hub 18.

The wheel drive system 10 further comprises a wheel actuator 50 comprising a motor 52 which rotates an output sprocket 60 (drive pinion) via a gearbox 70. The sprocket 60 is a wheel-type sprocket with radially-extending teeth which can interlock with the rollers 32 of the roller gear 34.

The wheel actuator 50 is supported by a bracket which is rigidly connected to the axle 14 of the landing gear and pivotally connected to the motor 52 about a pivot axis. The wheel actuator 50 may alternatively be mounted on the upper telescopic part (main fitting) or lower telescopic part 13 (slider). A linear actuator 58, such as a direct-drive roller-screw electro-mechanical linear actuator, extends between the bracket 56 (at an end nearest the axle 14) and the motor 52. Thus, linear movement of the actuator 58 is translated to rotational movement of the wheel actuator 50 causing the sprocket 60 to move between an engaged position in which the sprocket teeth interlock with the rollers 32 of the roller gear 34, and a disengaged position in which the sprocket teeth are physically separated from the rollers 32 of the roller gear 34. The sprocket 60 is therefore moved in a substantially radial direction with respect to the roller gear 34 axis of rotation between the engaged and disengaged positions.

It will be appreciated that the wheel drive system 10 may take a variety of forms. The wheel drive system 10 illustrated is an example of an open-geared arrangement where the engagement/disengagement of the wheel drive system is by moving the drive pinion in a substantially radial direction into/out of positive driving engagement with the driven gear. The drive pinion and driven gear respectively may be formed as a sprocket and roller gear (as illustrated); a sprocket and roller chain; a roller gear and sprocket; a roller chain and sprocket; or toothed gears, e.g. spur gears. Alternatively the drive pinion may move in a substantially axial direction (along the axis of rotation of the drive pinion) into and out of driving engagement with the driven gear.

Yet further alternatively a clutch device may be provided between the motor and the driven wheel. The motor may be disposed within the wheel hub or mounted adjacent the wheel. The driven wheel is permanently engaged with a portion of a drive path between the motor and the driven wheel, and the clutch device may make or break the drive path between the motor and the driven wheel. The engagement between the drive path and the driven wheel may be a geared drive or may be a friction drive.

Although the figures only show features of the wheel drive system 10 for driving one of the wheels 16, these features be mirrored for the other wheel 16. That is, one wheel drive system 10 may be provided for each wheel 16. For a landing gear 10 with four or more wheels 16, a wheel drive system 10 may be provided for each of the wheels 16, or for only two of them. In other embodiments it may be possible to have one motor 52 shared between two wheel drive systems 10. That is, the motor 52 may be arranged to rotate the output sprockets of each drive system. Additionally or alternatively a wheel drive system may drive one or more wheels of the nose landing gear 5.

Inside the wheel hub 18 is a friction brake arrangement indicated generally at 40. The friction brake arrangement 40 may be of conventional type and so will not be described in detail here. Generally, however, the aircraft friction brake arrangement includes a stator part and a rotor part comprising a stack of carbon disks. A brake actuator, which may be hydraulically or electrically operated, builds the pressure on the carbon stack to convert rotational torque of the wheel into heat thereby decelerating the aircraft. The brake actuator(s) are controlled by a braking control system (BCS) of the aircraft. The BCS responds to inputs, e.g. pilot and autopilot inputs, and commands a brake pressure accordingly.

Aircraft Longitudinal Stability

Whilst the tripod arrangement of landing gears 5, 6 is generally stable in the aircraft longitudinal direction when the aircraft is travelling forwards on the ground and the aircraft is decelerated by the friction brakes of the main landing gear, studies have shown that when the aircraft is performing an autonomous pushback operation application only a low level of braking torque using the friction brakes may be sufficient to disturb the aircraft longitudinal stability and risk a tip over event.

Pushback Tip Over

For longitudinal stability three different tip over cases have been identified:

Tail strike—The aircraft nose lifts and the tail impacts on the ground.

Nose lift up—The wheels of the nose landing gear momentarily lose contact with the ground but the aircraft does not sit on the tail.

Steering cam engagement—The load on the nose landing gear steering centring cam goes below a predetermined level at which the centring cam engages to maintain the nose landing gear wheels inline (zero degree position facing forwards along the aircraft centreline).

Figure 4:
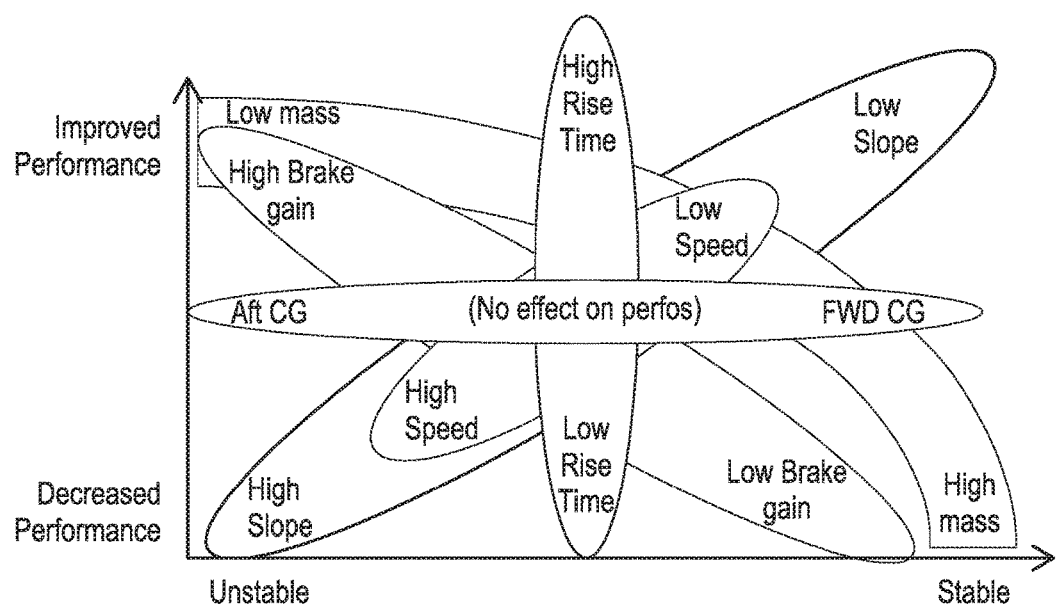
FIG. 4 illustrates a plot of the main contributors to the longitudinal stability and performance of the aircraft during an autonomous pushback operation.

FIG. 4 illustrates the effect of particular aircraft parameters on the aircraft longitudinal stability (x-axis) and aircraft performance (y-axis). The parameters considered are:

Aircraft Mass

Aircraft longitudinal centre of gravity (CG X) position

Apron (ground) slope

Inertia moment about pitch (y) axis, Iyy

Autonomous Pushback Speed

Brake Gain

Braking Rise time (time to build brake pressure to commanded level)

It has been identified that of these parameters a combination of an aft CG position, with a high pushback speed and a high apron slope angle may pose the greatest risk of a tip over event during an autonomous pushback manoeuvre. Although not shown in FIG. 4, it should also be noted that with an aft CG a higher mass is also more detrimental to the aircraft longitudinal stability.

Pushback Runaway

Simulations have also been performed for the pushback runaway condition if the autonomous pushback is performed on a slope. The longitudinal component of the gravity acceleration adds a component of the gravity force in the direction of the motion. The runaway condition is encountered when the gravity component on the aircraft longitudinal axis is higher than the sum of the aerodynamic drag and the friction forces on the ground. The runaway phenomenon is not affected by the aircraft mass. The highest slope angle achievable at the gate is assumed to be 1.15 degrees, or 2%. The study has shown if the autonomous pushback was to be performed without restrictions on the taxiway slope, the aircraft would need to be provided with a means of applying a relatively low retardation force to protect from pushback runaway.

Design Solution to Address Pushback Tip Over and/or Pushback Runaway

Various design solutions have been identified and these will be described detail.

1. Pushback Speed Limitation with Pilot Braking

One solution is to limit the pushback speed. By selecting the worst case combination of parameters (Brake Gain, Slope, Mass, CG, . . . ) a speed limit can be identified for a particular aircraft type up to which the aircraft BCS can apply full brake pressure without risks of tip over. Whilst this solution would negate risks of tip over the speed limit is likely to be very low, e.g. around 1 knot. This may be considered too low a pushback speed to be commercially viable.

Figure 5:
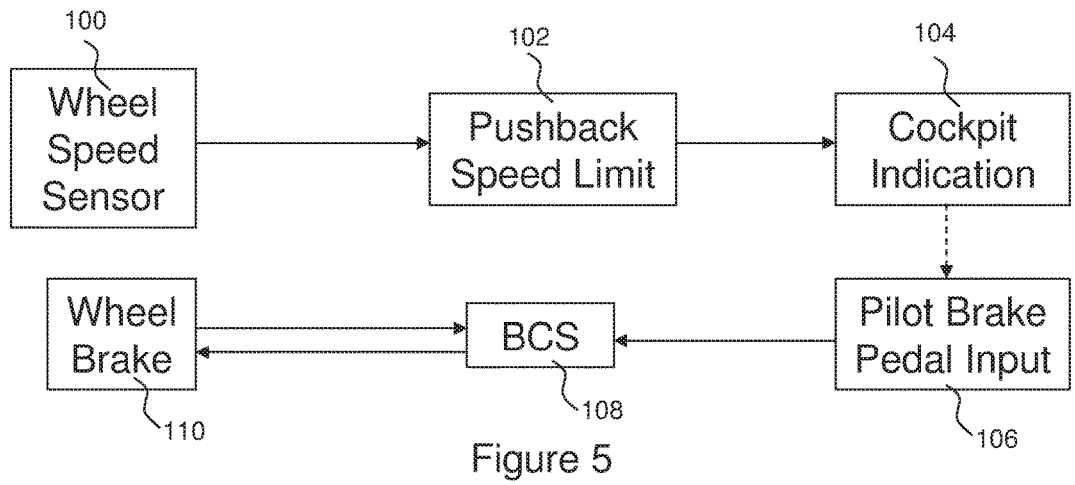
FIG. 5 illustrates a scheme for braking the aircraft using the aircraft's braking control system.

As shown in FIG. 5 the aircraft speed is detected, e.g. by a wheel speed sensor 100 (or alternatively from the aircraft inertial reference sensing system, a GPS system or a resolver in the wheel drive system 10), and if this is judged to be greater than or equal to the speed limit 102 then a cockpit indication 104 alerts the pilot that the reversing speed limit has been reached. Upon receiving the indication, e.g. as a visual, audible or tactile warning, the pilot would be required to react by using the conventional foot brake pedals 106. The BCS 108 would interpret the braking input in the usual manner and command a brake pressure to the wheel brake assemblies 110 depending on the degree of brake pedal deflection. Since the autonomous taxi speed limit is selected such that any brake pressure up to the full brake pressure will not risk a tip over event the pilot can make any brake input to stop the aircraft.

The components of conventional aircraft BCS generally have a significant level of inaccuracy, particularly at low brake pressures. For example, in a conventional hydraulic aircraft braking system the zero torque pressure (ZTP), i.e. the braking system pressure that will apply zero braking torque, may have a nominal value of around 15-20 bar. However, the actual ZTP may be significantly lower than this nominal value, e.g. around 10 bar. Furthermore, a valve regulating the hydraulic pressure at the brake actuators may have a tolerance of +/−5 bar or more at low brake pressures. There are yet further sources of inaccuracy.

Due to these BCS inaccuracies when the pilot makes a brake input to maintain the speed below the autonomous taxi speed limit it may be difficult for the pilot to bring the aircraft to a smooth stop. This would result in an unpleasant and discontinuous pushback manoeuvre.

A partial solution would be to limit the autonomous taxi speed to a higher speed limit than that mentioned above, and reducing the allowable Mass-CG combination for the aircraft, excluding the areas of the CG envelope where the tip over risk is higher, e.g. high mass and aft CG. These extremities of the mass-CG envelope of the aircraft would need to be restricted accordingly. However a limitation in the CG envelope is a limitation in the flexibility of the operability of the aircraft.

2. Use of Park Brake

Another solution is to use a modified park brake to stop the aircraft. In particular it would be possible to limit the rise rate of the braking application through one or more restrictors limiting the flow rate in the hydraulic system. Simulations have been carried out to evaluate for each speed the acceptable rise rate that would stop the aircraft, within acceptable passenger comfort level (assumed longitudinal deceleration lower than 0.2 G). The study indicates that the brake rise time would increase rapidly with increasing pushback speed.

In order to implement this solution the maximum pushback speed would still need to be limited to a low speed if the brake rise time is to be kept within acceptable limits. Since the park brake rise time is generally applicable for all aircraft operations it is not considered feasible to increase the brake rise time to the extent that its performance is limited, e.g. for taxiing with engines or hybrid (combined wheel taxi and engine taxi) operations. Accordingly, a low pushback speed limit would need to be imposed which may be similar to solution 1 above. Indeed solution 1 may be preferred.

Figure 6:
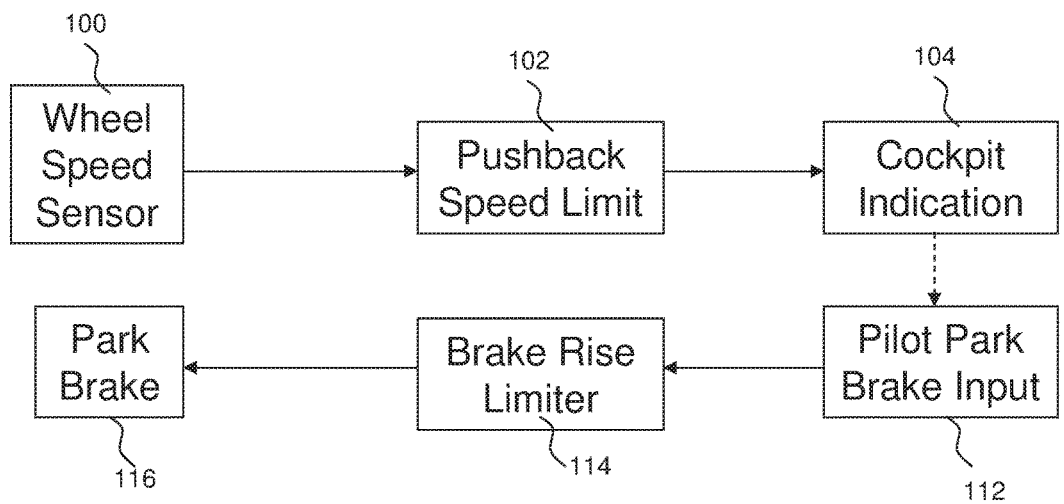
FIG. 6 illustrates a scheme for braking the aircraft using the aircraft's park brake.

FIG. 6 illustrates an implementation of the park brake solution, which is reliant on a cockpit indication 104 of when the pushback speed is greater than or equal to the pushback speed limit. In response to the cockpit indication the pilot would need to activate the park brake lever 112 in the cockpit which controls the park brake 116 having a brake rise limiter 114 to ensure than the deceleration is within the acceptable passenger comfort level (assumed longitudinal deceleration lower than 0.2 G) at the speed limit.

3. Braking with Limited Number of Brakes

A further solution involves commanding braking through a limited number of brakes. In order to achieve the same aircraft level retardation force a reduced number of brakes need to be commanded with a higher braking pressure.

For alternate braking the braking command is sent to a wheel pair (e.g. one main landing gear wheel on each side of the aircraft), hence the minimum number of braking wheels would be two. In this case the clamping braking pressure commanded could be raised to approximately double that of the baseline case where all four wheels of the main landing gears 6 are braked.

For normal braking a single braking command can be sent to one of the main landing gear wheels. In this case the clamping braking pressure commanded could be raised further to approximately quadruple that of the baseline case where all four wheels of the main landing gears 6 are braked.

This solution alone may not be able to accommodate full braking pressure without any risk of tip over, but may be used in combination with one or more other solutions presented here.

4. Single or Variable Maximum Brake Pressure Limitation

In this solution an overall brake pressure limitation is set to ensure the braking clamping pressure is never so high as to cause aircraft tip over. Preferably such pressure limitation is customised for each operational point in the CG-Mass diagram to optimise the maximum pressure applicable by the system depending on the aircraft load condition. By accurately measuring the vertical load through each landing gear leg (the sprung mass), e.g. using strain gauges on the main strut, and with prior knowledge of the un-sprung mass of each landing gear, the CG X position and mass of the aircraft can be determined. By plotting these values on the CG-Mass diagram the maximum brake clamping pressure can be determined.

5. Ramp Braking Law

Analysing the dynamic response of the aircraft in the limit case for nose lift-up we observe that there is a nose lift-up 'peak' immediately after the brake application, where the nose landing gear shock absorbers extend and the pitch angle reaches a maximum. Subsequently the aircraft tends to put the nose back down due to its weight.

This solution aims to prevent nose lift-up and obtain an optimised performance during braking by implementing a braking law that commands initially the maximum pressure that ensures no nose lift-up, and after the nose lift-up 'peak' increases gradually the braking command, up to the maximum system pressure.

The increase in pressure is initially very gentle and subsequently very rapid once the nose lift-up peak is safely overcome. Such behaviour can be modelled with an exponential function, e.g.:

$$P = \frac{P_2 - P_1 e^{\tau}}{1 - e^{\tau}} - \frac{P_1 - P_2}{1 - e^{\tau}} e^{\frac{t\tau}{T}}$$

Figure 7:
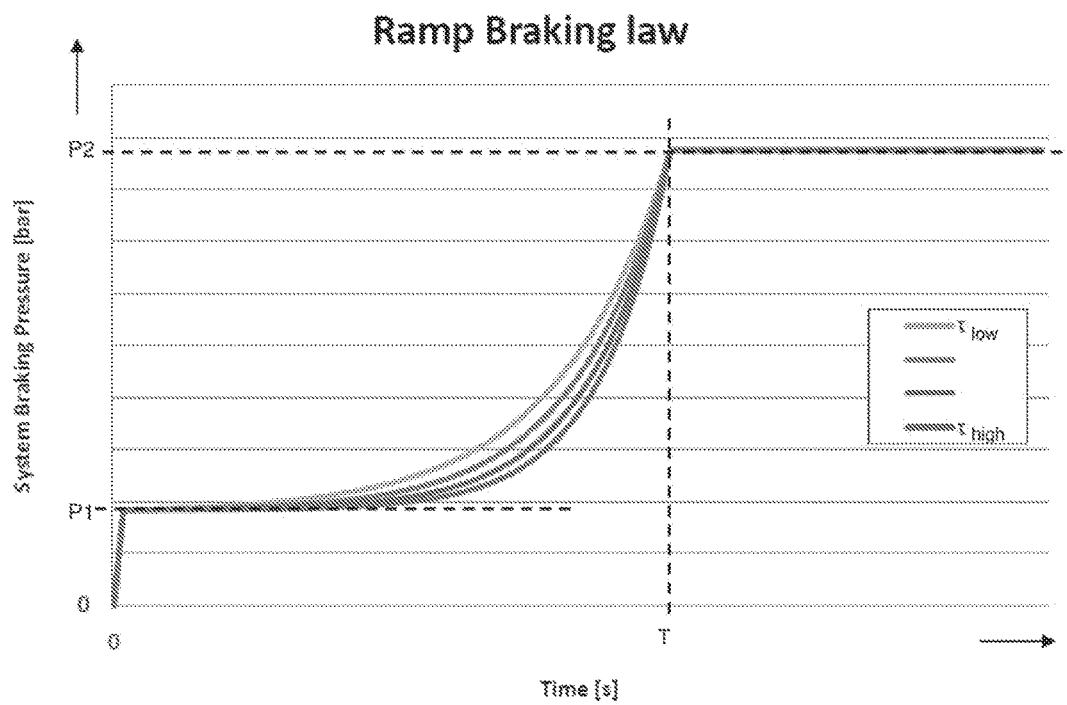
FIG. 7 illustrates a ramp braking law of the aircraft braking control system.

FIG. 7 illustrates graphically how the system braking pressure varies with time, where P2 is the final pressure (max system pressure), P1 is the initial pressure (max initial pressure to ensure no nose lift-up), and T is the total time from brake application to full brakes applied. The parameter, τ, regulates the behaviour of the ramp law. A high value of τ makes flatter the first part of the ramp law and steeper the second part, and vice versa.

This solution may be preferred, as it guarantees stability without compromising on performance (in all cases full braking application within T seconds), but has to take into account the limitations introduced by the low accuracy of conventional braking systems.

6. Braking Against the Wheel Actuator Motors

The main limitations of using the conventional braking system to provide the aircraft with retardation force include both the low limit of braking pressure that can be applied without risking aircraft tip-up and the low accuracy of conventional braking systems at very low pressures.

A solution that could mitigate both limitations includes using the autonomous wheel drive taxi system in conjunction with the BCS. The amount of wheel drive taxi system torque in the direction of motion is additional torque that needs to be demanded to the braking system to provide some retardation, and the inaccuracies of the BSCS can be balanced by a fine tuning of the wheel drive taxi system torque, to ensure the global retardation torque is sufficiently accurate.

This solution is particularly beneficial for the pushback runaway problem, for which the amount of required braking torque is very low and also very dependent on certain parameters (Slope, Mass, Brake Gain, . . . ).

Figure 8:
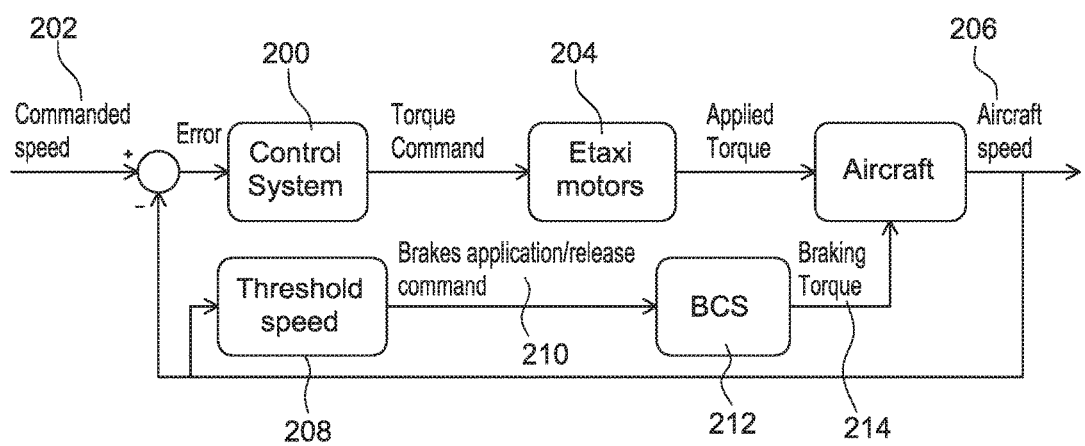
FIG. 8 illustrates a control scheme for controlling the wheel drive system and the braking control system of the aircraft.

FIG. 8 shows an example of a closed loop speed controller 200 for regulating the wheel drive taxi system torque during pushback. When a binary pushback command is sent from the pilot the autonomous wheel drive taxi system (or "eTaxi") motors 204 target the pushback speed 202, and in absence of apron slope the speed 206 is achieved and maintained by the aircraft, and there is no need to apply braking.

In the presence of a downhill slope (in the direction of motion) the aircraft tends to accelerate, as described above, and when it overshoots the target speed plus a defined tolerance, a threshold speed 208, a set amount of braking is commanded 210 to the BCS 212.

The additional braking torque 214 will act as an 'additional' resistive force that will tend to slow down the aircraft, hence the eTaxi speed controller 200 will reduce the amount of torque required to maintain the speed, so the overall contribution of eTaxi and braking will be a retardation force that is accurately controlled by the eTaxi controller.

When the slope decreases and drops below the pushback runaway limit the eTaxi system will saturate the torque controller to match the amount of braking provided. When this happens the eTaxi controller 200 will command braking release, as it will have detected the end of the slope.

7. Braking Through the eTaxi System

Figure 9:
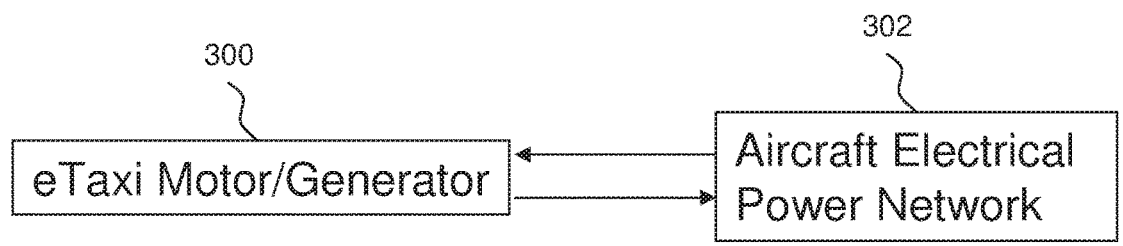
FIG. 9 illustrates a scheme for dissipating electrical power generated by a generator to the aircraft electrical power network.
Figure 10:
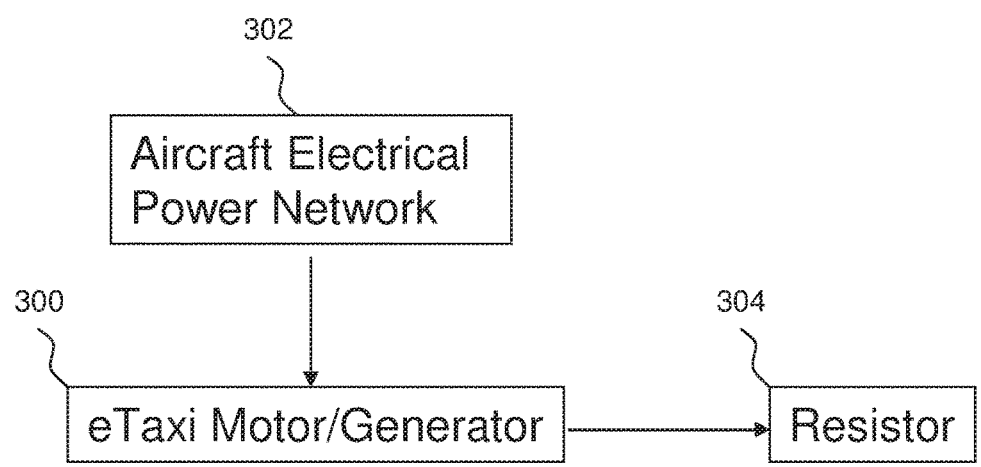
FIG. 10 illustrates a scheme for dissipating electrical power generated by a generator to a resistor.

The solution uses the dissipation of the power generated in the eTaxi electric motors (used as generators) 300 to provide the torque necessary to stop the aircraft. This solution requires the capability to sink power back into the aircraft electrical network 302 (as shown in FIG. 9), or to use a resistor 304 to dissipate the energy through the Joule Effect (as shown in FIG. 10).

Considering the maximum aircraft mass, M, and the pushback speed, V, the maximum kinetic energy, K, to be dissipated is (in the ideal case of 100% motor/generator efficiency):

$$K = \frac{1}{2}MV^2:$$

The amount of heat dissipated through the resistor and the maximum reachable brake temperature, Tmax, sizes the minimum required mass of the resistor at aircraft level. Assuming three consecutive full brakes application, and an initial brake temperature T1, the mass of the resistor $m_{res}$:

$$m_{res} = \frac{3K}{C_s \Delta T}$$

where Cs is the specific heat coefficient of the material chosen for the resistor and $\Delta T = T_{max} - T_1$. The mechanical power to be dissipated for each brakes application through the resistor, assuming no loss in the electro/mechanical chain is:

$$P = \frac{K}{\Delta t}$$

The mechanical power is the kinetic energy over the time interval $\Delta t$ for the braking, and is equal to the electric power dissipated through Joule effect, expressed as a function of the back emf ε induced in the motor:

$$\frac{K}{\Delta t} = \frac{\varepsilon^2}{R}$$

Assuming a resistor formed as a simple wire dissipating heat (hence not considering the insulation, and the resistor case) the resistance R can be expressed through the second Ohm's Law as a function of mass of the resistor and geometry:

$$R = \frac{\rho l}{A} = \frac{\rho l A}{A^2} = \frac{\rho V}{A^2} = \frac{m_{res}\rho}{\delta A^2}$$

Where ρ is the material's resistivity, l the length of the wire in the resistor, A the wire cross section's area, V the wire's total volume, and δ the material's density. Thus we obtain:

$$\varepsilon = \frac{K}{A}\sqrt{\frac{C_m}{\Delta T \Delta t}} \text{ with } C_m = \frac{\rho}{\delta C_s}$$

where $C_m$ is constant, depending on the chosen material.

ε is the amount of back emf that the system has to be able to tolerate. In order to minimise this quantity the time interval (duration of the braking) has to be increased, and a material providing a low Cm has to be selected. This means to select a material with low resistivity (good conductor), a high density and a high specific heat coefficient. Suitable candidate materials include steel, copper and aluminium, with copper or steel being preferred.

The weight and space impact of the resistor will also need to take into account a consistent amount of insulating material around the resistor wire, adding mass and volume. It may be preferable to split the amount of power to dissipate among more resistors, e.g. at least one per landing gear, in order to optimise the dissipation within the available space.

For dissipation of the power generated in the electric motors the wheel drive system 10 needs to be capable of being back-driven. The wheel drive system 10 shown in FIG. 3 is particularly suitable as the sprocket 60 is in positive meshing engagement with the roller gear 34 when the wheel drive system is in operation. Other wheel drive systems that include an over-running clutch in the drive path between the wheel and the motor would not be suitable as these only permit drive torque to be passed from the motor to the wheel and not vice versa.

The clutch-less wheel drive system 10 shown in FIG. 3 is also particularly beneficial as the physical separation between the drive pinion and the driven gear when the system is moved to the disengaged position ensures that on landing there is no drive path between the wheel and the motor.

Although the invention has been described above with reference to one or more preferred embodiments, it will be appreciated that various changes or modifications may be made without departing from the scope of the invention as defined in the appended claims.

The invention claimed is:

1. A method of controlling speed of an aircraft during backwards motion of the aircraft when in contact with the ground, the method comprising:
applying a torque to at least one landing gear wheel of the aircraft, the torque is in a direction opposite to the backwards rolling direction of rotation of the landing gear wheel,
wherein the torque applied does not exceed a limit for ensuring aircraft longitudinal stability,
wherein the step of applying torque to the landing gear wheel comprises applying a braking torque to the wheel using a friction brake assembly,
wherein the method further comprises the steps of:
measuring the aircraft speed,
comparing the measured aircraft speed to a predetermined threshold limit, the predetermined threshold limit is that at which the aircraft longitudinal stability is not ensured, and
displaying a warning indication in the aircraft cockpit when the measured speed exceeds that predetermined threshold limit.

2. The method of controlling speed of an aircraft according to claim 1, wherein the torque applied does not exceed a limit at which aircraft longitudinal stability is ensured such that the aircraft does not tip back onto a tail of the aircraft.

3. The method of controlling speed of an aircraft according to claim 1 wherein the torque applied does not exceed a limit at which aircraft longitudinal stability is ensured such that a nose landing gear of the aircraft does not part contact with the ground.

4. The method of controlling speed of an aircraft according to claim 1 wherein the torque applied does not exceed a limit at which aircraft longitudinal stability is ensured such that a substantially vertical load through a nose landing gear wheel does not fall below a threshold at which a steering centering device maintains the wheel of the nose landing gear straight.

5. The method of controlling speed of an aircraft according to claim 1, wherein the torque limit is based upon one or more of the following instantaneous aircraft parameters when the torque is applied: a slope angle of the ground over which the aircraft is moving; the center of gravity of the aircraft; the mass of the aircraft; an aircraft inertia moment around the aircraft lateral (y) axis; the backwards speed of the aircraft.

6. The method of controlling speed of an aircraft according to claim 1, wherein the backwards motion of the aircraft is effected by a wheel actuator carried by the aircraft for driving one or more of the aircraft's landing gear wheels in rotation.

7. The method of controlling speed of an aircraft according to claim 1, wherein the backwards motion of the aircraft is effected autonomously in the absence of an external tractor unit.

8. The method of controlling speed of an aircraft according to claim 1, wherein the backwards motion of the aircraft is effected by gravity due to a slope angle of the ground over which the aircraft is moving.

9. The method of controlling speed of an aircraft according to claim 1, wherein the braking torque is initiated by a pilot input.

10. The method of controlling speed of an aircraft according to claim 1, where the braking torque is effected by a braking control system.

11. The method of controlling speed of an aircraft according to claim 1, wherein the braking torque is effected by a park brake system.

12. The method of controlling speed of an aircraft according to claim 10, wherein the aircraft has N braking wheels and the braking control system sends a braking command to a number n of the braking wheels where n<N.

13. The method of controlling speed of an aircraft according to claim 10, wherein the braking control system limits the maximum braking clamping pressure applicable to the friction brake assemblies to no more than a limit at which the aircraft longitudinal stability is ensured.

14. The method of controlling speed of an aircraft according to claim 13, wherein the maximum braking clamping pressure is variable depending on the mass and longitudinal center of gravity position of the aircraft.

15. The method of controlling speed of an aircraft according to claim 10, wherein the braking control system implements a braking law that commands initially a low brake pressure which rises with increasing time.

16. The method of controlling speed of an aircraft according to claim 6, wherein the braking torque is applied whilst the wheel actuator is driving the aircraft backwards.

17. The method of controlling speed of an aircraft according to claim 16, wherein the wheel actuator torque and the braking torque are controlled by a common controller.

18. The method of controlling speed of an aircraft according to claim 17, wherein the controller receives input of the aircraft speed and controls the wheel actuator torque and the braking torque towards a target speed.

19. The method of controlling speed of an aircraft according to claim 1, wherein the step of applying torque to the landing gear wheel comprises applying a braking torque to the wheel using a generator.

20. The method of controlling speed of an aircraft according to claim 19, wherein the generator is coupled either to an electrical network of the aircraft or to a resistor for dissipating the electrical energy generated by the generator.

21. The method of controlling speed of an aircraft according to claim 19, wherein the generator is a motor/generator used to drive one or more of the aircraft's landing gear wheels in rotation to effect the backwards motion of the aircraft.

22. The method of controlling speed of an aircraft according to claim 21, wherein the motor/generator is selectively coupled to the landing gear wheel(s) by a drive path.

23. The method of controlling speed of an aircraft according to claim 22, wherein the drive path includes a gear mounted to the wheel rim and a pinion, wherein the pinion is moveable between an engaged position in which the pinion is in driving engagement with the wheel gear and a disengaged position in which the pinion is physically separated from the wheel gear.

24. An autonomous pushback braking system for an aircraft, comprising:
- a wheel drive system for driving one or more of the aircraft's landing gear wheels in rotation, wherein the wheel drive system is operable to drive the wheel in rotation to effect backwards motion of the aircraft when in contact with the ground, a friction brake assembly for applying a braking torque to at least one landing gear wheel of the aircraft, the torque is in a direction opposite to the backwards rolling direction of rotation of the landing gear wheel, and wherein the torque applied does not exceed a limit for ensuring aircraft longitudinal stability, wherein a measured aircraft speed is compared to a predetermined threshold limit at which the aircraft longitudinal stability is not ensured, and wherein a warning indication is displayed in the aircraft cockpit when the measured speed exceeds that predetermined threshold limit.

25. The autonomous pushback braking system for an aircraft according to claim 24, further comprising a friction brake assembly for applying a braking torque to the wheel.

26. The autonomous pushback braking system for an aircraft according to claim 24, further comprising a sensor for determining the aircraft speed relative to the ground.

27. The autonomous pushback braking system for an aircraft according to claim 26, further comprising a cockpit indicator for indicating to a pilot when the aircraft speed exceeds a predetermined threshold limit at which the aircraft longitudinal stability is not ensured.

28. The autonomous pushback braking system for an aircraft according to claim 25, further comprising a braking control system for sending a braking command to the friction brake assembly.

29. The autonomous pushback braking system for an aircraft according to claim 28, wherein the braking control system is adapted to receive a pilot braking input.

30. The autonomous pushback braking system for an aircraft according to claim 25, further comprising a park brake system for sending a braking command to the friction brake assembly.

31. The autonomous pushback braking system for an aircraft according to claim 28, wherein the aircraft has N braking wheels and the braking control system is adapted to send a braking command to a number n of the braking wheels where n<N.

32. The autonomous pushback braking system for an aircraft according to claim 28, wherein the braking control system is adapted to limit the maximum braking clamping pressure applicable to the friction brake assemblies to no more than a limit at which the aircraft longitudinal stability is ensured.

33. The autonomous pushback braking system for an aircraft according to claim 32, wherein the maximum braking clamping pressure is variable depending on the mass and longitudinal center of gravity position of the aircraft.

34. The autonomous pushback braking system for an aircraft according to claim 28, wherein the braking control system is adapted to implement a braking law that commands initially a low brake pressure which rises with increasing time.

35. The autonomous pushback braking system for an aircraft according to claim 25, wherein the friction brake system is adapted to apply the braking torque whilst the wheel drive system is driving the aircraft backwards.

36. The autonomous pushback braking system for an aircraft according to claim 35, further comprising a common controller for controlling the wheel drive system torque and the braking torque.

37. The autonomous pushback braking system for an aircraft according to claim 36, wherein the controller is adapted to receive input of the aircraft speed and to control the wheel actuator torque and the braking torque towards a target speed.

38. The autonomous pushback braking system for an aircraft method according to claim 24, further comprising a generator for applying a braking torque to the wheel.

39. The autonomous pushback braking system for an aircraft according to claim 38, wherein the generator is coupled either to an electrical network of the aircraft or to a resistor for dissipating the electrical energy generated by the generator.

40. The autonomous pushback braking system for an aircraft according to claim 38, where in the generator is a motor/generator forming part of the wheel drive system.

41. The autonomous pushback braking system for an aircraft according to claim 40, wherein the motor/generator is selectively coupled to the landing gear wheel(s) by a drive path.

42. The autonomous pushback braking system for an aircraft according to claim 41, wherein the drive path includes a gear mounted to the wheel rim and a pinion, wherein the pinion is moveable between an engaged position in which the pinion is in driving engagement with the wheel gear and a disengaged position in which the pinion is physically separated from the wheel gear.

43. An aircraft including the autonomous pushback braking system of claim 24.

44. The autonomous pushback braking system for an aircraft according to claim 24, wherein the wheel drive system is supported by a bracket which is rigidly connected to the axle, main fitting or slider part of the landing gear.

* * * * *